United States Patent [19]

Komanduri

[11] Patent Number: 4,702,649
[45] Date of Patent: Oct. 27, 1987

[54] POLYCRYSTALLINE DIAMOND AND CBN CUTTING TOOLS

[75] Inventor: Ranga Komanduri, Schenectady, N.Y.

[73] Assignee: General Electric Company, Schenectady, N.Y.

[21] Appl. No.: 833,930

[22] Filed: Feb. 27, 1986

[51] Int. Cl.[4] ............................................. B23B 27/20
[52] U.S. Cl. ..................................... 407/119; 51/293; 51/307; 51/309; 76/101 R; 76/DIG. 12; 125/39; 175/329; 175/330; 175/410; 408/145
[58] Field of Search .................. 407/118, 119; 51/293, 51/295, 306, 307, 309; 175/327, 330, 410; 76/101 R, 101 A, DIG. 12; 408/144, 145; 125/39

[56] References Cited

U.S. PATENT DOCUMENTS

| | | | |
|---|---|---|---|
| 3,369,283 | 2/1968 | Colding | 407/119 |
| 3,743,489 | 7/1973 | Wentorf et al. | |
| 3,745,623 | 7/1973 | Wentorf et al. | |
| 4,252,102 | 2/1981 | Phaal et al. | 407/119 |
| 4,255,165 | 3/1981 | Dennis et al. | 51/309 |
| 4,268,276 | 5/1981 | Bovenkerk | 51/309 |
| 4,373,593 | 2/1983 | Phaal et al. | 175/329 |
| 4,437,800 | 3/1984 | Arakai et al. | 407/119 |
| 4,448,591 | 5/1984 | Ohno | 407/119 |
| 4,592,433 | 1/1986 | Dennis | 175/329 |

FOREIGN PATENT DOCUMENTS

| | | |
|---|---|---|
| 0003915 | 5/1979 | European Pat. Off. . |
| 0019461 | 11/1980 | European Pat. Off. . |
| 0104893 | 4/1984 | European Pat. Off. . |
| 0138392 | 4/1985 | European Pat. Off. . |
| 1489130 | 10/1977 | United Kingdom . |

OTHER PUBLICATIONS

Abstract of South African Application 80/2747 (one page).

Primary Examiner—Nicholas P. Godici
Assistant Examiner—Jerry Kearns
Attorney, Agent, or Firm—Jane M. Binkowski; James C. Davis, Jr.; Paul R. Webb, II

[57] ABSTRACT

A cutting tool comprised of an annular polycrystalline layer of diamond or cubic boron nitride integrally adhered to an annular recess in an upper peripheral portion of an integral cemented carbide substrate structure, said layer having a round cutting edge, one face of the layer being adhered to the bottom surface of the recess and an innular annular side of the layer being adhered to the inner wall of the recess, the thickness of the polycrystalline layer and the height of the wall being substantially equivalent.

39 Claims, 6 Drawing Figures

POLYCRYSTALLINE DIAMOND AND CBN CUTTING TOOLS

This invention relates to the production of polycrystalline diamond and cubic boron nitride (CBN) cutting tools.

Ser. No. 06/830,414 filed on Feb. 18, 1986 for POLYCRYSTALLINE DIAMOND AND CBN CUTTING TOOLS by R. Komanduri, assigned to the assignee hereof and incorporated herein by reference, discloses a cutting tool comprised of a polycrystalline layer of diamond or cubic boron nitride which has a cutting edge and at least one straight edge wherein one face of the polycrystalline layer is adhered to a substrate of cemented carbide and wherein a straight edge is adhered to one side of a wall of cemented carbide which is integral with the substrate, the thickness of the polycrystalline layer and the height of the wall being substantially equivalent.

Ser. No. 06/833,928 filed 2/27/86, filed on even date herewith for POLYCRYSTALLINE DIAMOND AND CBN CUTTING TOOLS by R Komanduri, asigned to the assignee hereof and incorporated herein by reference, discloses a cutting tool comprised of a polycrystalline layer of diamond or cubic boron nitride integrally adhered to a side and base of an upper recessed edge portion of a cemented carbide substrate structure, said layer having a tool nose of a given radius joining two substantially straight edges, a face of said layer being adhered to the bottom surface of the recessed portion and a round side of the layer being adhered to the wall of the recessed portion, the thickness of the polycrystalline layer and the height of the wall being substantially equivanlent.

Polycrystalline diamond and cubic boron nitride cutting tools have a thin diamond/CBN layer (about 0.030 inch) on top of a cemented tungsten carbide substrate. Because of the high temperature-high pressure process and high processing costs involved in the fabrication of ultrahard tool materials the cost of these tools is very high. With the introduction of new, less expensive ceramic tools, competition is becoming intense between the superhard tools and ceramics. One way to reduce the cost of the tools is to reduce the material costs by providing small size inserts. The final size can be obtained by pressing to near-net size or pressing a larger size insert and slicing it into small segments. This invention deals with the latter case.

Another way to reduce the costs is to reduce the fabricating costs. The raw material (diamond or CBN) cost is minimized by this invention by using it only in the region where it is needed for the cutting operation. This will, at the same time, reduce the fabrication costs, since most of the tool to be fabricated involves cemented carbide material instead of the hard, super abrasive diamond or CBN. Cost of the insert can be further reduced by wire electrical discharge machining (EDM) slicing of the specimen into four tools by this invention. The cemented carbide backing at the bottom and on the side of the resulting cutting tool provides the support for the somewhat brittle diamond/CBN layer. The backing also facilitates brazing of the tool to the tool holder without degrading the diamond/CBN layer.

This invention will be better understood from the following description and drawings in which.

Figure 1:
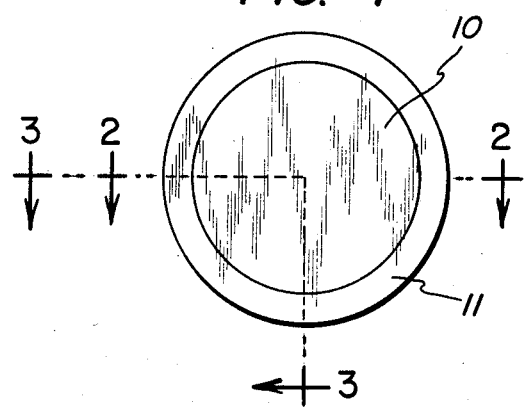
FIG. 1 is a top view of one embodiment of the present composite useful as a circular cutting tool or for slicing into a plurality of cutting tools.

Briefly stated, the present process for producing a composite comprised of an annular polycrystalline diamond or cubic boron nitride layer integrally adhered in an annular recess in an upper peripheral portion of a cemented carbide substrate structure comprises forming a substrate structure comprised of a substantially cylindrical substrate with an annular recess at an upper peripheral portion thereof, said cemented carbide being comprised of polycrystalline metal carbide containing a metallic cementing agent, filling said recess with crystals of diamond, heating the resulting assembly under an applied pressure to a temperature above the melting point of said metallic cementing agent but below a temperature which has any significant deleterious effect on said assembly for a period of time sufficient to form said composite and recovering said composite, the thickness of said polycrystalline diamond layer being substantially equivalent to the depth of said recess.

The structure and size of the present composite allows it to be cross-sectionally sliced to form a plurality of cutting tools.

In the present process a substrate structure comprised of polycrystalline metal carbide containing a metallic cementing agent, i.e. a cemented carbide, is used. Cemented carbide bodies are commercially available and are well known in the art, and have been used as substrates for polycrystalline diamond/CBN cutting tools.

Generally, the cemented carbide body is produced by forming a compact of a sinterable carbide molding powder into a desired shape and size and sintering the compact. Usually, the sinterable powder is comprised of a mixture of a metal carbide powder and powdered metallic cementing agent, preferably selected from the group consisting of cobalt, nickel or iron. The carbide portion of the molding powder is preferably selected from the group consisting of tungsten carbide, titanium carbide, tantalum carbide, and mixture thereof (although other carbides may be added to obtain special properties). The compact is sintered in a protective atmosphere such as nitrogen or argon at a temperature which depends largely on its composition for a period of time sufficient to produce a cemented carbide of desired density. Suitable sintering temperatures generally range from about 1340° C. to about 1600° C. Generally, the composition of the compact as well as the resulting sintered body is comprised of from about 75 to 97% by weight carbide and about 3 to 25% by weight of the metallic cementing agent.

Preferably, the cemented carbide of the present invention has a porosity of less than about 15% by volume, more preferably less than about 10%, still more preferably less than about 5%, still more preferably less than about 1% by volume, and most preferably it has no significant porosity.

In carrying out the present process, a substrate structure is formed which is comprised of a cylindrical or substantially cylindrical substrate with an annular recess in an upper peripheral portion thereof. The width and depth of the recess depends on the width and thickness of the polycrystalline diamond or cubic boron nitride layer to be formed. The bottom surface of the recess is flat or substantially flat. The recess can have one or two annular side walls which are an integral part of the substrate structure. Specifically, a recess having only one side wall, i.e. an inner side wall, would lead to the production of the composite shown in FIG. 1.

Figure 4:
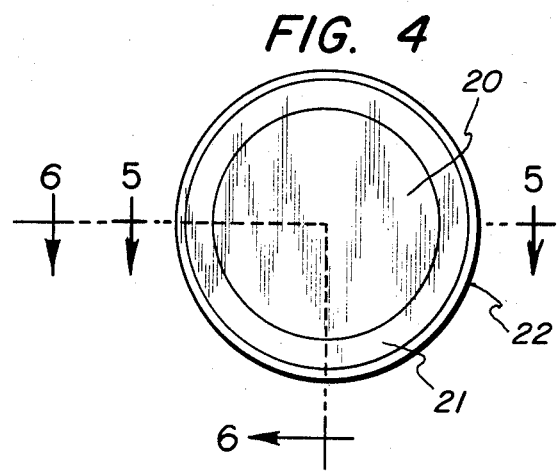
FIG. 4 is a top view of another embodiment of the present composite.
Figure 5:
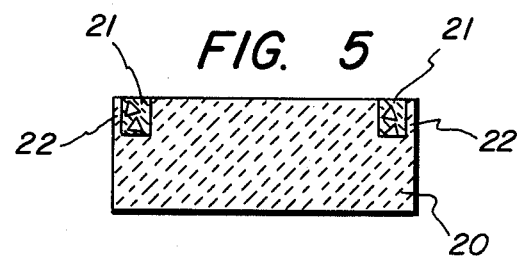
FIG. 5 is a cross section of the composite of FIG. 1 taken on line 5—5.

Alternatively, a recess having an inner and an outer side wall would lead to the production of the composite shown in FIG. 4. The inclusion of an outer side wall for the recess is one technique of maintaining the crystals in the recess. This outer side wall of the recess should be thin, generally ranging from about 0.001 inch to about 0.050 inch in thickness, since it will be removed from the resulting composite to product a cutting tool. Preferably, the unsintered compact is in the form required of the present substrate structure and sintered to produce the present sintered substrate structure directly. Alternatively, the present substrate structure can be produced by forming the annular recess in the sintered substrate by a technique such as, for example, electrical discharge machining.

The present substrate structure should be at least sufficiently thick so that it can be held in a cutting tool holder. Generally, the thickness of the substrate, except for its recess portion, is at least about 0.04 inch, and frequently it ranges from about 0.04 inch to about 0.25 inch. The total diameter of the substrate structure depends largely on the size of the cutting tool desired, and generally, it ranges from about 0.25 inch to about 1.5 inch.

Since the substrate structure is comprised of cemented carbide, its dimensions are not significantly changed by the present process, i.e. it substantailly retains its shape. In the final product, i.e. composite, the thickness of the polycrystalline diamond or cubic boron nitride layer is equivalent or substantially equivalent to the depth of the recess.

The recess of the cemented carbide substrate structure is filled with crystals of diamond or cubic boron nitride. The thickness of the filling depends largely upon the thickness and type of polycrystalline layer desired in the final product and is determinable empirically. Preferably, the crystals fill the recess in excess of its depth to produce a higher degree of consolidation under the present high pressure conditions. The average size of the crystals can range widely and is determined empirically depending largely on the temperature and pressure conditions used as well as the type of polycrystalline layer desired in the cutting tool. Frequently, the crystals have an average size ranging from less than or about 1 micron to about 150 microns. The resulting assembly is then heated under applied pressure and temperature to produce the present composite.

Preferably, in carrying out the present process, the substrate structure is closely fitted into a cup or sleeve of a suitable shield metal with the recess exposed, and the recess is filled with diamond or CBN crystals to form the present assembly. A charge assembly is formed by capping the cup with a disc of shield metal or closing the ends of the sleeve with discs of shield metal. The enclosure of shield metal is normally used to prevent entry of oxygen in high temperature and pressure techniques used to form dense diamond or cubic boron nitride compacts as disclosed in U.S. Pat. Nos. 3,743,489 and 3,745,623, assigned to the assignee hereof and incorporated herein by reference. Representative of a useful shield metal is zirconium, titanium, tantalum, tungsten and molybdenum.

The charge assembly is then placed in the reaction vessel of a high temperature, high pressure apparatus preferably of the type used for synthesizing diamonds or dense diamond compacts.

One preferred form of a high pressure, high temperature apparatus in which the instant invention may be practiced is the belt-type apparatus disclosed in U.S. Pat. No. 2,941,248—Hall (incorporated by reference) as well as in numerous other patents and publications. Those skilled in the art should, therefore, be well acquainted with this "belt-type" apparatus and, for this reason, no effort has been made to illustrate the apparatus in the drawings.

Essentially, the apparatus consists of a pair of cemented tungsten carbide punches disposed on either side of an intermediate belt or die member of the same material. The space between the two punches and the die is occupied by the reaction vessel and surrounding gasket/insulation assemblies therefor. High pressures are generated in the reaction vessel from the compressive forces causes by the relative movement of the co-axially disposed punches toward each other within the die. Means are provided for heating the reaction vessel during the application of pressure.

Various reaction vessel configurations are shown in the patent literature (e.g. U.S. Pat. No. 3,423,177—Bovenkerk, incorporated by reference). U.S. Pat. Nos. 3,743,489 and 3,745,623 also disclose apparatus in which the present process can be carried out.

Operational techniques for simultaneously applying both high pressures and high temperatures in such apparatus are well known to those skilled in the superpressure art. There are, of course, various other apparatuses capable of providing the required pressures and temperatures that may be employed within the scope of this invention.

The assembly is heated under applied pressure to a temperature above the melting point of the cementing agent of the cemented carbide to a temperature which has no significant deleterious effect thereon for a period of time at least sufficient to produce the present composite. Generally, the temperature ranges from about 1300° C. to about 1600° C. and the time period is in excess of three minutes. The applied pressure depends largely on the particular temperature and crystals used.

Since the present bonding process is carried out at high pressures and temperatures, care must be taken not to graphitize the diamond starting material. A simple procedure employed to avoid this occurrence entails first establishing pressure conditions well within the diamond stable region on the phase diagram of carbon and thereafter raising the temperature. Specifically, when diamond is used, the minimum applied pressure should be sufficient to prevent graphitization of the diamond at the process temperature. For diamond, at 1300° C., the minimum applied pressure generally is about 50 kilobars whereas at 1400° C. the minimum pressure generally is about 52.5 kilobars.

Also, when cubic boron nitride crystals are used, sufficient pressure preferably is applied thereto before the system is heated to ensure thermodynamically stable conditions for cubic boron nitride. Specifically, when cubic boron nitride crystals are used, the minimum applied pressure should be sufficient to ensure thermodynamically stable conditions for cubic boron nitride at the process temperature. Specifically, for cubic boron nitride crystals, at 1300° C. the minimum applied pressure generally is about 40 kilobars and at 1600° C., the minimum applied pressure generally is about 50 kilobars.

In the present process, the sintering or cementing metallic agent of the cemented carbide melts and becomes fluid or semifluid and part of it is displaced from the substrate structure resulting in formation of the present composite wherein the crystals are bonded together in situ and to the substrate structure. The in situ bonding of the present composite allows the production of cutting tools therefrom without the use of brazing agents.

In one embodiment of the present process utilizing cubic boron nitride crystals, aluminum and an alloying metal of nickel, cobalt, manganese, iron, vanadium or chromium are deposited on the crystals to produce an aluminum alloy which alloys with the cementing agent during the process as disclosed in U.S. Pat. No. 3,743,489. The amount of aluminum ranges from about 1 to about 40% by weight of cubic boron nitride and the alloying metal ranges from about 2 to about 100% by weight of cubic boron nitride. Preformed aluminum alloys can be used. The aluminum alloy is particularly effective in the bonding together of cubic boron nitride crystals smaller than about 30 micrometers in largest dimension.

Upon completion of the high temperature, high pressure process, the temperature preferably is reduced first, and then the pressure to ensure the stability of the diamond or cubic boron nitride.

Upon recovery of the present composite, protective shield metal which remains affixed to the outer surfaces thereof can be ground away in a conventional manner.

The polycrystalline diamond or cubic boron nitride layer of the present composite is directly bonded to the substrate structure, i.e. to the inner surface of the recess. The in situ bonding of the composite can vary depending largely on the particular processing conditions and the particular crystals used. For example, the polycrystalline layer may form an interface with the substrate structure and/or the interface may be at least partly or mostly comprised of the cementing agent of the substrate structure. Also, the polycrystalline layer may or may not contain a metallic phase. The polycrystalline diamond or cubic boron nitride layer is sufficiently thick and contains a sufficient concentration of diamond or cubic boron nitride to make it useful as a cutting tool. Generally, for a number of cutting applications, the diamond or cubic boron nitride layer has a thickness ranging from about 0.005 inch to about 0.125 inch. Preferably, the volume fraction of diamond or cubic boron nitride is greater than 70% by volume of the layer. Frequently, the average crystal size of the polycrystalline layer ranges from about 1 $\mu$m to about 150 $\mu$m.

In one embodiment, the present composite shown in FIG. 1 is comprised of an annular polycrystalline diamond or cubic boron nitride layer 11 integrally adhered to an annular recess in an upper peripheral portion of substrate structure 10. The substrate structure is comprised of a cylindrical substrate having an annular recess in an upper peripheral portion thereof. A face of the polycrystalline layer is adhered to the bottom surface of the recess. The inner annular side wall of the polycrystalline layer is adhered to the inner annular wall of the recess. The polycrystalline diamond or CBN layer in this composite has an exposed round or substantially round cutting edge which makes it useful as a circular cutting tool. The thickness of the polycrystalline layer is equivalent or substantially equivalent to the depth of the recess. The mass of the substrate structure is significantly or substantially larger than the mass of the polycrystalline layer.

The embodiment of the present composite shown in FIG. 4 differs from that of FIG. 1 in that the outer side wall of the polycrystalline diamond or CBN layer 21 is adhered to an outer wall 22 of substrate structure 20.

The present composite is sufficiently large to enable formation of four cutting tools therefrom. Preferably, the polycrystalline layer has a width of at least about 0.025 inch, and generally ranges from about 0.025 inch to about 0.5 inch.

The composite can be cross-sectionally sliced to produce a plurality, usually four, of finished or unfinished cutting tools. Such slicing can be carried out in a conventional manner by, for example, sawing, electrical discharge machining or laser machining. Preferably, such slicing is carried out by wire electrical discharge machining. Preferably, before this slicing procedure, the composite is ground and polished flat to give the required shape, size and finish. At this time, the outside wall 22 of the composite of FIG. 4 can be removed to produce the configuration of the composite shown in FIG. 1, or if desired, it can be removed during the slicing procedure.

The present cutting tool is comprised of an annular or substantially round polycrystalline diamond or cubic boron nitride layer integrally adhered in an annular recess in an upper peripheral portion of an integral substrate structure. The substrate structure has an open recessed edge portion bounded on one side by an annular wall. The exposed portion of the polycrystalline layer has a round or substantially round cutting edge. One face of the polycrystalline diamond or CBN layer is adhered to the bottom surface of the recessed portion of the substrate and is coextensive or substantially coextensive therewith. The inner annular side wall of the polycrystalline diamond or CBN layer is adhered to an annular wall of the recess, i.e. substrate. The thickness of the polycrystalline diamond or cubic boron nitride layer and the height of the wall are equivalent or substantially equivalent.

Figure 2:
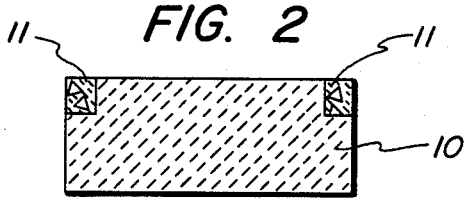
FIG. 2 is a cross section of the composite of FIG. 1 taken on line 2—2.

FIG. 2 shows the direct bonding of layer 11 to substrate structure 10 and that layer is substantially level with the top surface of substrate structure 10.

Figure 3:
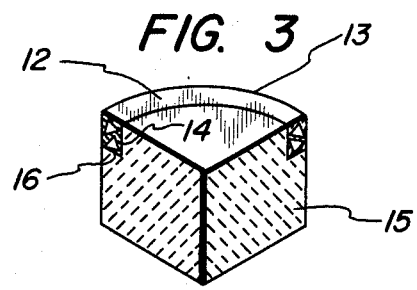
FIG. 3 is a view in perspective of a cutting tool formed by cutting through the composite of FIG. 1 on line 3—3.

By slicing the composite of FIG. 1, the cutting tool of FIG. 3 can be produced with annular polycrystalline diamond or CBN layer 12 having round cutting edge 13. Layer 12 is integrally adhered to an annular recess in substrate structure 15. Specifically, a face of layer 12 is integrally adhered to the bottom surface 16 of the recess and its inner annular side is adhered to annular wall 14 of the recess. The top surface of layer 12 is substantially level with the top surface of substrate structure 15.

Figure 6:
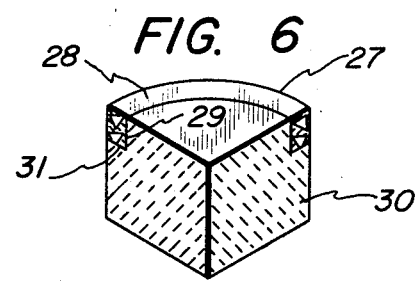
FIG. 6 is a view in perspective of a cutting tool produced by cross-sectionally slicing the composite of FIG. 4 along line 6—6 and removing outer wall 22.

FIG. 6 shows the cutting tool formed by cross-sectionally slicing the composite of FIG. 4 including grinding off wall 22. Specifically, FIG. 6 shows polycrystalline diamond or CBN layer 28 with round cutting edge 27. Layer 28 is integrally adhered to an annular recess of substrate structure 30. Specifically, a face of layer 28 is adhered to the bottom surface 31 of the recess and its inner annular side is adhered to annular wall 29 of the substrate structure 30.

It is to be understood that the cutting tools produced by the present invention will, most usually, be mounted or bonded to a larger body, e.g. a tool shank or a milling cutter or a drill bit, for presentation to the material to be cut. The present cutting tools are useful for grinding or cutting materials having a hardness between about 2 to 9 hardness on the Moh scale. For example, the present cutting tools are useful in turning, boring and milling operations on metals such as copper, brass, bronze, silver, gold, platinum and alloys of aluminum, magnesium, steels, superalloys, titanium and zinc. The present cutting tools are also useful in the machining of non-metallic materials such as plastics, stone, concrete, composites and ceramics.

The invention is further illustrated by the following examples wherein the procedure was as follows:

The substrate structure was comprised of cemented carbide, i.e. polycrystalline tungsten carbide cemented with cobalt which was present in an amount of about 13% by weight of the cemented carbide body. The cemented carbide body had a porosity of less than about 5% by volume.

The high pressure high temperature apparatus used was substantially of the same type disclosed in U.S. Pat. No. 3,745,623.

EXAMPLE 1

The composite illustrated in FIG. 1 was prepared in this example.

A cemented carbide disk about 0.125 inch thick and about 0.35 inch in diameter was subjected to cylindrical precision grinding to remove material along an outside edge portion to form an open annular recess in an upper peripheral portion thereof. Specifically, the recess had a substantially flat bottom surface, a width of about 0.060 inch and a depth of about 0.060 inch.

This substrate structure was fitted into a molybdenum cup so that the recess was exposed. The recess was then filled with a slight excess of diamond crystals having an average size range of about 10–40 μm with some fines.

The cup was then capped with a disc of molybdenum and the resulting assembly was placed in the reaction vessel of the high pressure high temperature apparatus. The pressure was raised to about 55 kilobars. The temperature was then raised to about 1450° C. where it was held for about 10 minutes. Heat input was then ceased and after the system had cooled to close to ambient temperature, the pressure was released. The resulting composite having molybdenum adhered to its outer surface was then recovered. The molybdenum deposit was removed from the composite by grinding.

The composite was surface ground on the flat faces and the periphery by cylindrical precision grinding to give the required shape, size and finish. This resulting composite with its outer circular cutting edge as illustrated in FIG. 1 would be useful as a cutting tool if mounted in a cutting tool holder. The composite was then cross-sectionally sliced into four substantially equivalent finished cutting tools using wire electrical discharge machining. Slicing of the composite along line 3—3 of FIG. 1 illustrates the production of one of the cutting tools which is shown in FIG. 3.

Each resulting cutting tool was in the form of a sector of a circle as illustrated in FIG. 3. Specifically, each cutting tool had a round cutting edge 13 and a radius of about 0.175 inch. The polycrystalline diamond layer of each cutting tool was integrally adhered to the substrate structure. The polycrystalline diamond layer had a thickness of about 0.05 inch and a concentration of diamond greater than about 70% by volume of the layer.

Each cutting tool, if mounted in a tool holder, would be useful for cutting materials such as the abrasive aluminum-silicon alloys.

EXAMPLE 2

In this example, the composite illustrated in FIG. 4 was produced.

A cemented carbide disk about 0.125 inch thick and about 0.35 inch in diameter was subjected to electrical discharge machining to remove material from a face of the disk to form an annular recess in its upper peripheral surface portion. The recess had an outer side wall, a substantially flat bottom surface, a width of about 0.050 inch and a depth of about 0.050 inch. The width of cemented carbide wall 22, the outer side wall of the recess, was about 0.005 inch.

The procedure used for producing polycrystalline diamond layer in this example was substantially the same as that disclosed in Example 1. Also, the resulting composite was surface ground substantially as disclosed in Example 1, and the periphery of the composite was ground to remove wall 22 which surrounded the diamond layer and to give the required shape, size and finish. The resulting composite was then sliced in substantially the same manner disclosed in Example 1 to produce four finished cutting tools, one of which is illustrated in FIG. 6. A comparison of the cutting tools of FIGS. 3 and 6 shows that they are substantially the same. Specifically, each cutting tool of this example had a radius of about 0.17 inch.

The polycrystalline diamond layer of each cutting tool was integrally adhered to the substrate structure. The polycrystalline diamond layer had a thickness of about 0.05 inch and a concentration of diamond greater than about 70% by volume of the layer.

Each cutting tool, if mounted in a tool holder, would be useful for cutting materials such as the abrasive aluminum-silicon alloys.

What is claimed is:

1. A process for producing a composite of an annular polycrystalline diamond layer integrally adhered in an annular recess in an upper peripheral portion of a cemented carbide substrate structure wherein said diamond layer is directly bonded to said substrate structure at least partly by forming an interface therewith which consists essentially of forming a substrate structure consisting essentially of a substantially cylindrical substrate with an annular recess with only one side wall in an upper peripheral portion thereof, said cemented carbide consisting essentially of from about 75% by weight to about 97% by weight of polycrystalline metal carbide and from about 3% by weight to about 25% by weight of a metallic cementing agent, filling said recess with crystals of diamond, heating the resulting assembly under an applied pressure to a temperature above the melting point of said metallic cementing agent but below a temperature which has any significant deleterious effect on said assembly for a period of time sufficient to bond said crystals together and form said composite and recovering said composite, the thickness of said polycrystalline diamond layer being substantially equivalent to the depth of said recess.

2. The process of claim 1 wherein said polycrystalline diamond layer has a width of at least about 0.025 inch.

3. The process of claim 1 wherein said recess has only one side wall.

4. The process of claim 1 wherein said cementing agent is selected from the group consisting of cobalt, nickel and iron.

5. The process of claim 1 wherein said cemented carbide is selected from the group consisting of tungsten carbide, titanium carbide, tantalum carbide and a mixture thereof.

6. The process of claim 1 wherein except for said recess said substrate structure has a thickness ranging from about 0.04 inch to about 0.25 inch.

7. The process of claim 1 wherein said temperature ranges from about 1300° C. to about 1600° C.

8. The process of claim 1 wherein said polycrystalline diamond layer ranges in thickness from about 0.005 inch to about 0.125 inch.

9. The process of claim 1 wherein said composite is sliced to form a plurality of cutting tools, each cutting tool being in the form of a sector of a circle and each having a substantially round cutting edge.

10. The process of claim 1 wherein said recess has an inner and an outer side wall.

11. The process according to claim 1 wherein said polycrystalline layer is free of metallic phase.

12. The process according to claim 1 wherein said polycrystalline layer is bonded to said substrate structure by forming an interface therewith.

13. The process according to claim 1 wherein said polycrystalline layer is free of metallic phase and is bonded to said substrate structure by forming an interface therewith.

14. A process for producing a composite of an annular polycrystalline cubic boron nitride layer integrally adhered in an annular recess in an upper peripheral portion of a cemented carbide substrate structure wherein said cubic boron nitride layer is directly bonded to said substrate structure at least partly by forming an interface therewith which consists essentially of forming a substrate structure consisting essentially of a substantially cylindrical substrate with an annular recess with only one side wall in an upper peripheral portion thereof, said cemented carbide consisting essentially of from about 75% by weight to about 97% by weight of polycrystalline metal carbide and from about 3% by weight to about 25% by weight of a metallic cementing agent, filling said recess with crystals of cubic boron nitride, heating the resulting assembly under an applied pressure to a temperature above the melting point of said metallic cementing agent but below a temperature which has any significant deleterious effect on said assembly for a period of time sufficient to bond said crystals together and form said composite and recovering said composite, the thickness of said polycrystalline cubic boron nitride layer being substantially equivalent to the depth of said recess.

15. The process of claim 14 wherein said polycrystalline cubic boron nitride layer has a width of at least about 0.025 inch.

16. The process of claim 14 wherein said recess has only one side wall.

17. The process of claim 14 wherein said cementing agent is selected from the group consisting of cobalt, nickel and iron.

18. The process of claim 14 wherein said cemented carbide is selected from the group consisting of tungsten carbide, titanium carbide, tantalum carbide and a mixture thereof.

19. The process of claim 14 wherein except for said recess said substrate structure has a thickness ranging from about 0.04 inch to about 0.25 inch.

20. The process of claim 14 wherein aluminum and an alloying metal selected from the group consisting of nickel, cobalt, manganese, iron, vanadium and chromium are deposited on said crystals of cubic boron nitride, said aluminum ranging from about 1% by weight to about 40% by weight of the weight of said crystals of cubic boron nitride and said alloying metal ranging from about 2% by weight to about 100% by weigth of the weight of said crystals of cubic boron nitride.

21. The process of claim 14 wherein said temperature ranges from about 1300° C. to about 1600° C.

22. The process of claim 14 wherein said polycrystalline cubic boron nitride layer ranges in thickness from about 0.005 inch to about 0.125 inch.

23. The process of claim 14 wherein said composite is sliced to form a plurality of cutting tools, each cutting tool being in the form of a sector of a circle and each having a substantially round cutting edge.

24. The process of claim 14 wherein said recess has an inner and an outer side wall.

25. The process according to claim 14 wherein said polycrystalline layer is free of metallic phase.

26. The process according to claim 14 wherein said polycrystalline layer is bonded to said substrate structure by forming an interface therewith.

27. The process according to claim 14 wherein said polycrystalline layer is free of metallic phase and is bonded to said substrate structure by forming an interface therewith.

28. A composite useful for slicing into a plurality of cutting tools wherein each cutting tool has a substantially circular cutting edge which consists essentially of an annular polycrystalline diamond or cubic boron nitride layer integrally adhered to an annular recess in an upper peripheral portion of a substrate structure at least partly forming an interface therewith, said substrate structure consisting essentially of a substantially cylindrical substrate having an annular recess with only one annular side wall in an upper peripheral portion thereof, a face of said polycrystalline layer being integrally adhered to the bottom surface of said recess, the inner annular side wall of said layer being integrally adhered to the inner annular side wall of said recess, the thickness of said polycrystalline layer being substantially equivalent to the depth of said recess, the mass of said substrate structure being significantly larger than the mass of said layer, said substrate structure consisting essentially of from about 75% by weight to about 97% by weight of polycrystalline metal carbide and from about 3% by weight to about 25% by weight of a metallic cementing agent.

29. The composite according to claim 28 wherein said metal carbide is predominantly comprised of a material selected from the group consisting of tungsten carbide, titanium carbide, tantalum carbide and a mixture thereof.

30. The composite according to claim 28 wherein the outer side wall of said layer is integrally adhered to an outer wall of said substrate structure.

31. The composite according to claim 28 wherein said polycrystalline layer is free of metallic phase.

32. The composite according to claim 28 wherein said polycrystalline layer is bonded to said substrate structure by forming an interface therewith.

33. The composite according to claim 28 wherein said polycrystalline layer is free of metallic phase and is bonded to said substrate structure by forming an interface therewith.

34. A cutting tool consisting essentially of a structure in the form of a sector of a circle having a substantially round cutting edge, said cutting tool consisting essentially of a polycrystalline diamond or cubic boron nitride layer integrally adhered to an annular recess with only one annular side wall in an upper peripheral portion of an integral substrate structure at least partly forming an interface therewith, said polycrystalline layer having a face adhered to the bottom surface of said recess and an inner annular side adhered to the wall of said recess of said substrate structure, said polycrystalline layer having an exposed portion in the form of said substantially round cutting edge, the thickness of said polycrystalline layer and the height of said wall being substantially equivalent, the mass of said substrate structure being significantly larger than the mass of said layer, said substrate structure consisting essentially of from about 75% by weight to about 97% by weight of polycrystalline metal carbide and from about 3% by weight to about 25% by weight of a metallic cementing agent.

35. The cutting tool according to claim 34 wherein said metal carbide consists essentially of a material selected from the group consisting of tungsten carbide, titanium carbide, tantalum carbide, and a mixture thereof.

36. The cutting tool according to claim 34 wherein said cementing agent is selected from the group consisting of cobalt, nickel and iron.

37. The cutting tool according to claim 34 where in said polycrystalline layer is free of metallic phase.

38. The cutting tool according to claim 34 wherein said polycrystalline layer is bonded to said substrate structure by forming an interface therewith.

39. The cutting tool according to claim 34 wherein said polycrystalline layer is free of metallic phase and is bonded to said substrate structure by forming an interface therewith.

* * * * *